United States Patent [19]
Tabata et al.

[11] Patent Number: 5,825,456
[45] Date of Patent: Oct. 20, 1998

[54] STEREOSCOPIC VIDEO DISPLAY APPARATUS

[75] Inventors: Seiichiro Tabata, Hino; Yoichi Iba, Hachioji, both of Japan

[73] Assignee: Olympus Optical Company, Ltd., Tokyo, Japan

[21] Appl. No.: 652,822

[22] Filed: May 23, 1996

[30]       Foreign Application Priority Data

May 24, 1995   [JP]   Japan ................................... 7-124661

[51] Int. Cl.$^6$ ....................................................... A61B 3/08
[52] U.S. Cl. ............................................. 351/201; 348/51
[58] Field of Search .................................. 351/158, 201; 359/462, 468, 469; 348/42, 51, 54, 55, 115

[56]                References Cited

U.S. PATENT DOCUMENTS

| | | | |
|---|---|---|---|
| 4,895,431 | 1/1990 | Tsujiuchi et al. | 348/51 |
| 5,034,809 | 7/1991 | Katoh | 358/88 |
| 5,233,458 | 8/1993 | Moffitt et al. | 351/201 |
| 5,357,293 | 10/1994 | Uomori et al. | 351/201 |
| 5,510,832 | 4/1996 | Garcia | 348/51 |

FOREIGN PATENT DOCUMENTS 5-292543   11/1993   Japan .
6-85590   10/1994   Japan .

*Primary Examiner*—Huy Mai
*Attorney, Agent, or Firm*—Stevens, Davis, Miller & Mosher, L.L.P.

[57]                ABSTRACT

An apparatus for displaying a stereoscopic image including right-eye and left-eye image display devices displaying right-eye and left-eye images, respectively, right-eye and left-eye magnifying lenses forming enlarged virtual right-eye and left-eye images, respectively, an eye point camera for detecting a point in a sight at which a viewer gazes, a parallax calculating circuit for deriving a parallax of the gazed point, a image shift amount calculating circuit for calculating an amount of image shift in accordance with the parallax, and an image shift circuits for shifting the right-eye and left-eye images horizontally in opposite direction by the same amount such that a distance of convergence with respect to the gazing point is substantially fixed. It is preferable to shift the right-eye and left-eye images such that the distance of convergence becomes substantially equal to a viewing distance from eyes of the viewer to a virtual image plane.

33 Claims, 15 Drawing Sheets

FIG_1A
PRIOR ART
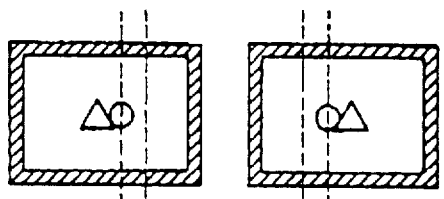
FIG_1B
PRIOR ART
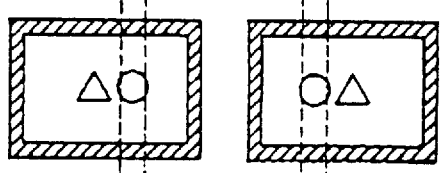
FIG_1C
PRIOR ART
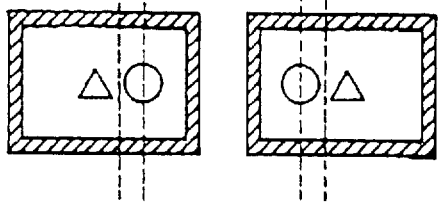

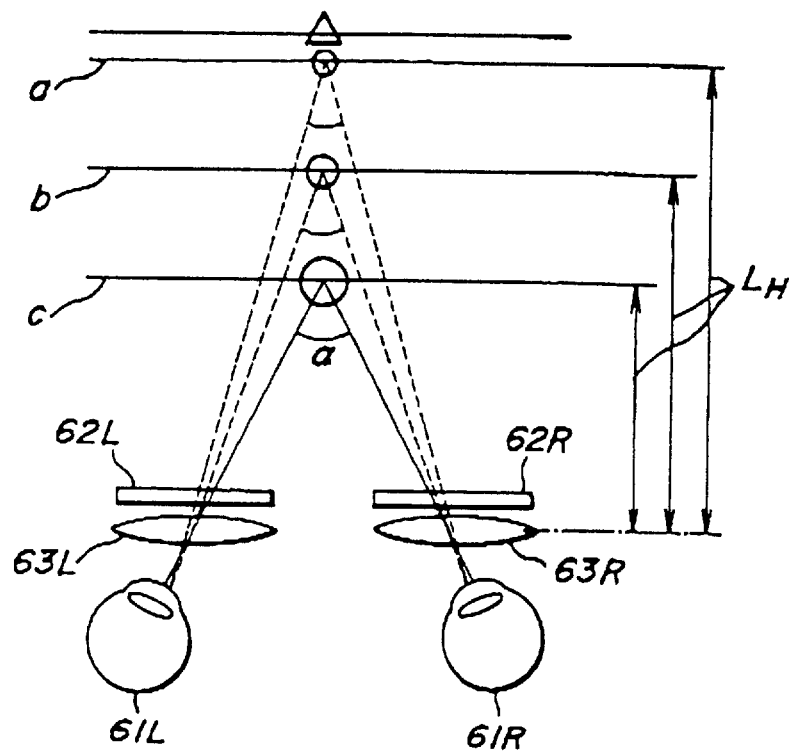
FIG_2
PRIOR ART

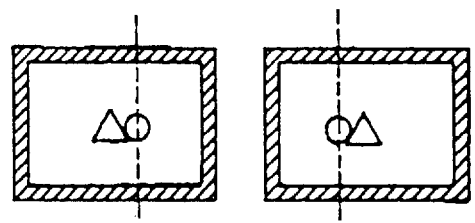
FIG_3A
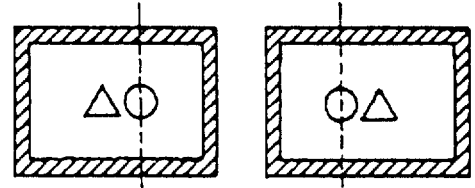
FIG_3B
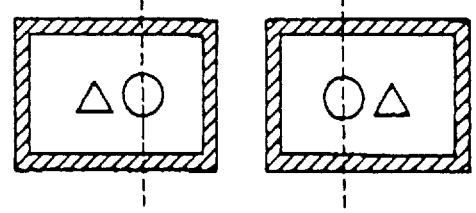
FIG_3C

FIG_5A 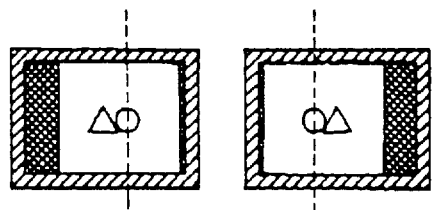
FIG_5B 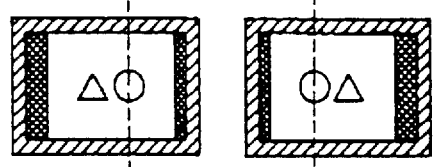
FIG_5C 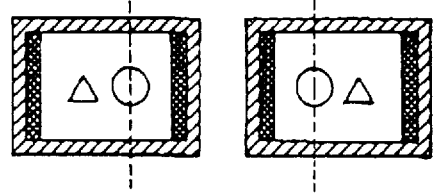

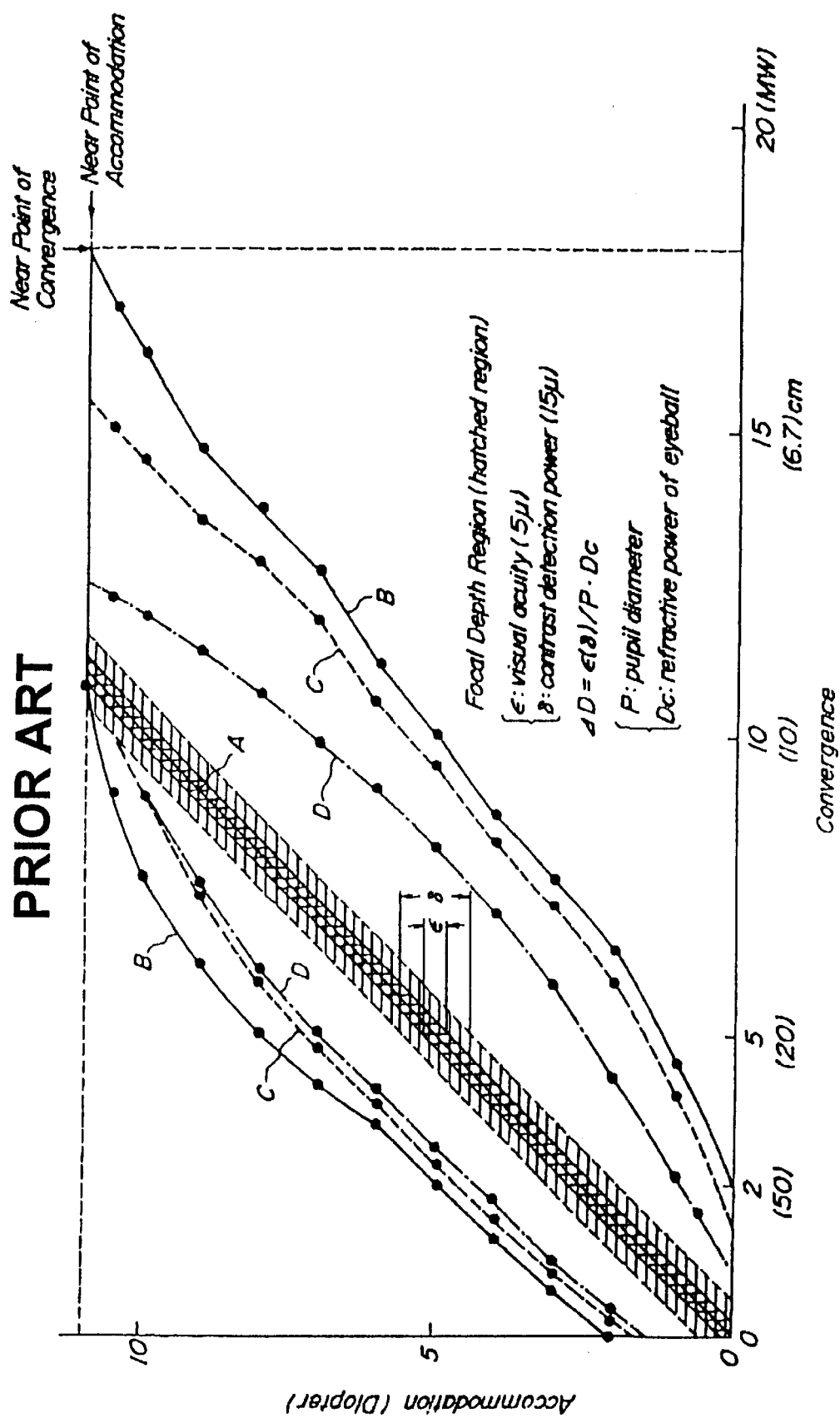

FIG_7
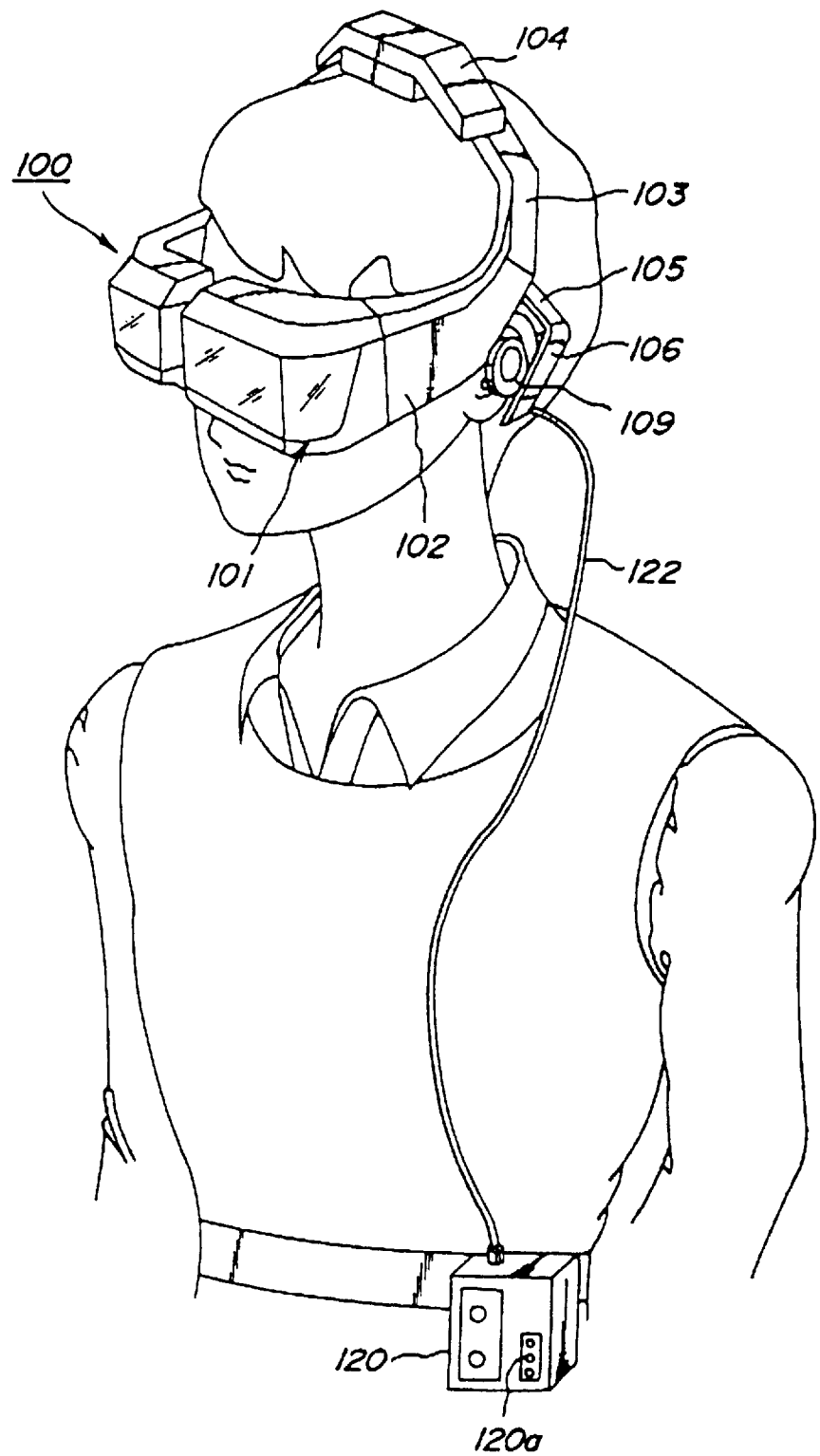

FIG_13
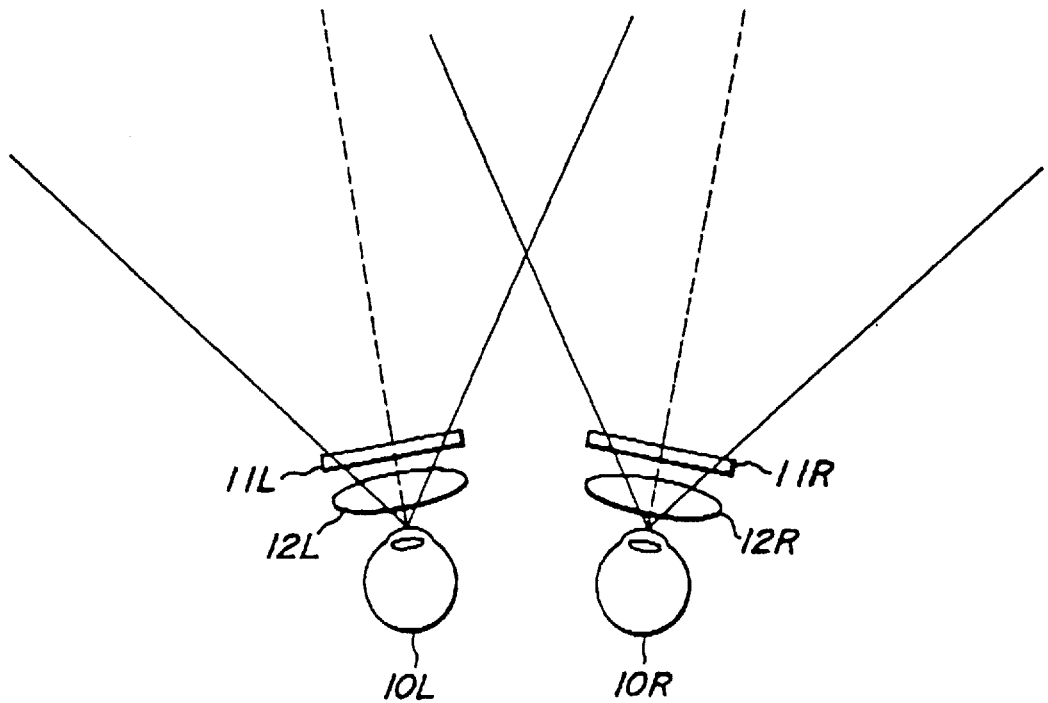
FIG_14
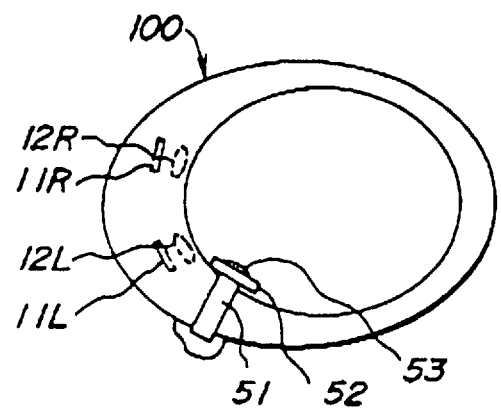

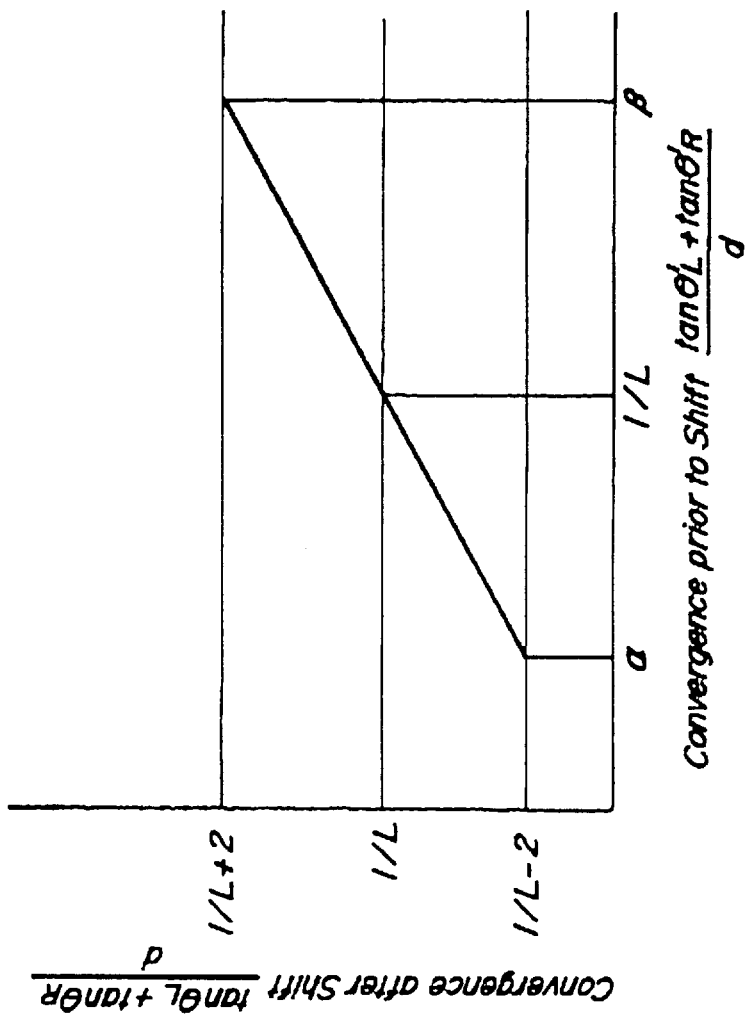

FIG_16A
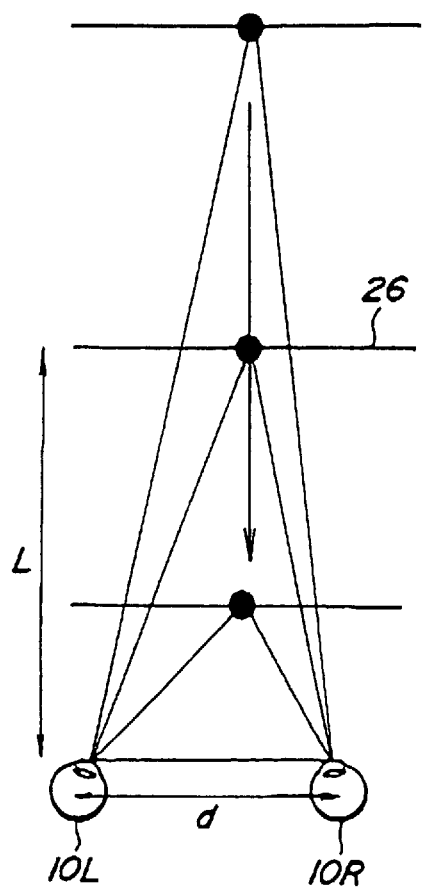
FIG_16B
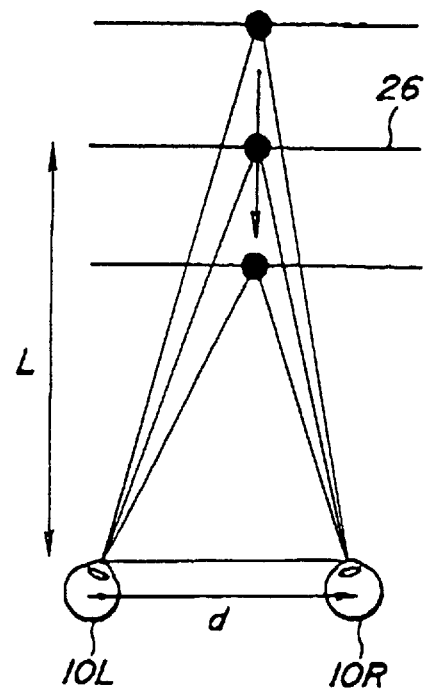

STEREOSCOPIC VIDEO DISPLAY APPARATUS

BACKGROUND OF THE INVENTION

1. Field of the Invention

The present invention relates to a stereoscopic video display apparatus, and more particularly to an apparatus for displaying a stereoscopic image which can be monitored by a user with a natural feeling of depth in a field of view.

2. Description of Related Art

There have been developed various types of stereoscopic video display apparatuses. For instance, in a shutter type stereoscopic video display apparatus, right-eye image and left-eye image are alternately introduced into right eye and left eye of a viewer by means of a shutter system. In a lenticular type stereoscopic video display apparatus, a lenticular lens is provided in front of a display screen such that a right-eye image is selectively seen by a right eye and a left-eye image is selectively seen by a left eye. Recently there has been developed a head mounted display apparatus (HMD) including right-eye and left-eye liquid crystal display devices (LCD) and right-eye and left-eye magnifying lenses, a right-eye image displayed on the right-eye LCD being seen by a right eye by means of the right-eye magnifying lens and a left-eye image displayed on the left-eye LCD being seen by a left eye by means of the left-eye magnifying lens.

Now it is assumed that a video image including a triangular object and a circular object as shown in FIGS. 1A–1C is seen by the above mentioned HMD, and a viewer gazes at the circular object, e.g. a ball as a main subject. A video image signal represents the ball coming closer to the viewer. Then, right-eye and left-eye images are changed as illustrated in FIGS. 1A, 1B and 1C successively. In these images a position and a size of the triangular object such as a circular cone are not changed because this object has to be suspected by the viewer to be stationary. However, a position and a size of the circular object are successively changed. That is to say, the circular object is moved toward a center between a right eye and a left eye, while a size of the circular object becomes larger.

FIG. 2 is a schematic diagram showing a fusion of the right-eye and left-eye images seen by the viewer. In FIG. 2, right-eye magnifying lens 63R and left-eye magnifying lens 63L form enlarged virtual images of right-eye and left-eye images displayed on right-eye and left-eye display devices 62R and 62L, respectively, said enlarged right-eye and left-eye images are selectively seen by right and left eyes 61R and 61L of a viewer. In FIG. 2, planes a, b and c correspond to the displayed images of the circular object shown in FIGS. 1A, 1B and 1C, respectively. The circular object can be seen to situate on these planes a, b and c, successively. Therefore, a parallax becomes larger. Then, a right eye 61R of the viewer is rotated in the counterclockwise direction and a left eye 61L is rotated in the clockwise direction, so that a convergence angle α becomes larger. It should be noted that the convergence angle α is defined by an angle between an optical axis of the right eye and an optical axis of the left eye. In the specification of the present application, a distance between the a point at which the optical axes of the right and left eyes cross each other and the eyes is termed as a distance of convergence. In the HMD, the distance of convergence is identical with a distance $L_H$ between a point at which principal rays of the right-eye and left-eye images cross each other and principal planes of the right-eye and left-eye magnifying lenses 63R and 63L.

When the convergence occurs, the accommodation of the eyes is induced simultaneously. When the angle of convergence becomes larger, the right and left eyes of the viewer are adjusted such that a closer object can be seen as an in-focused image, and when the angle of convergence becomes smaller, the viewer's eyes are adjusted to see a remote object as an in-focused image. However, in the HMD, a plane which can be seen with a best contrast is fixed. In the present specification, a distance between this plane and the eyes is termed as the viewing distance. That is to say, the viewing distance between the plane on which virtual images are formed by the magnifying lenses 63R, 63L and the viewer's eyes 61R, 61L is constant. This is contradict to the natural feeling of the eyes, and thus the stereoscopic image could not be seen with the natural feeling and the feeling of stereoscopic vision is deteriorated. This problem occurs not only in the HMD, but also in the above mentioned shutter type and lenticular type stereoscopic video display apparatuses.

There have been proposed various methods for mitigating the above explained problem. For instance, in Japanese Patent Application Laid-open Publication Kokai Hei 3-292093, a gazing point in an image is detected and the magnifying lenses are moved in accordance with range information of the detected gazing point to change the viewing distance. In this known method, it is possible to make the viewing distance identical with the distance of convergence. However, it is required to provide a rather complicated mechanism for moving mechanically the magnifying lenses, and thus a whole apparatus is liable to be large in size and heavy in weight.

In Japanese Patent Application Laid-open Publication Kokai Hei 5-292543, there is proposed another solution. In this solution, gazing points of right and left eyes of a viewer are detected by an eye point camera and one of right-eye and left-eye images is shifted in such a manner that a subject is displayed on the same points on the displayed right-eye and left-eye images. However, in this known method, the viewing distance is not taken into consideration and the viewing distance does not become equal to the distance of convergence. That is to say, in this known method, there is not provided a means for making the viewing distance and the distance of convergence to be identical with each other, so that the feeling of stereoscopic vision is deteriorated.

In Japanese Patent Publication Kokoku Hei 6-85590, there is proposed another method, in which a range of a subject in a sight is detected by processing output signals from an eye point camera and positions of right-eye and left-eye virtual images are shifted in accordance with the detected range of the subject, while a deviation of the viewing distance due to the image shift is compensated for by adjusting focal lengths of the magnifying lenses. Also in this method, it is required to provide a mechanism for adjusting mechanically the focal lengths of the magnifying lenses, and thus the apparatus is liable to be large in size and heavy in weight.

In U.S. Pat. No. 5,034,809 issued to H. Katoh, there is described another known display apparatus, in which the viewing distance and the distance of convergence are made identical with each other by arranging right-eye and left-eye display devices to be shifted with respect to optical axes of right-eye and left-eye magnifying lenses, respectively. However, in this known apparatus, the viewing distance becomes equal to the distance of convergence only when right-eye image and left-eye image are identical with each other. When these images are different from each other, the viewing distance is no more equal to the distance of convergence as illustrated in FIG. 3(b) of this prior art reference. In the stereoscopic image, the distance of convergence is usually changed in accordance with time and the distance of convergence is varied in accordance with a subject in an image. In this prior art reference, there is no teaching how to bring the thus varying distance of convergence to be identical with the viewing distance.

In the above mentioned known video display apparatuses in which the mechanical means is provided, it is necessary to always drive or adjust the magnifying lenses or display devices. Therefore, the displayed image is subjected to vibration and a viewer could not see a stable image. Further, a large electric power is consumed for driving the mechanism, so that a large and heavy battery of large capacity has to be installed. This is apparently disadvantageous for a portable type video display apparatus such as HMD.

SUMMARY OF THE INVENTION

The present invention has for its object to provide a novel and useful stereoscopic video display apparatus, in which feeling of viewing a stereoscopic image can be improved without providing a mechanism for mechanically moving image display devices and optical systems relative to each other.

It is also an object of the present invention to provide a head mounted type stereoscopic video display apparatus which is small in size and light in weight, while natural feeling of stereoscopic vision can be improved.

According to the invention, a stereoscopic video display apparatus comprises:

a displaying means for displaying a right-eye image to be exclusively seen by a right eye of a viewer and a left-eye image to be exclusively seen by a left eye of the viewer, said right-eye and left-eye images composing a stereoscopic image; and an image shifting means for shifting horizontally at least one of said right-eye image and left-eye image displayed on said displaying means such that a distance of convergence is maintained substantially constant on a time domain.

In a preferable embodiment of the apparatus according to the invention, said displaying means displays the right-eye and left-eye images composing a stereoscopic image whose distance of convergence is changed on a time domain, and said image shifting means shifts at least one of the right-eye and left-eye images horizontally such that said distance of convergence becomes substantially identical with a viewing distance.

In this preferable embodiment, not only the distance of convergence is kept substantially constant, but also the distance of convergence is made substantially identical with the viewing distance, and therefore the viewer can see the stereoscopic image with natural feeling.

In another preferable embodiment of the stereoscopic video display apparatus according to the invention, said displaying means includes a right-eye image display device and a left-eye image display device, said apparatus further comprises a right-eye magnifying lens for generating an enlarged virtual image of the right-eye image which can be seen by the right eye of the viewer and a left-eye magnifying lens for generating an enlarged virtual image of the left-eye image which can be seen by the left eye of the viewer, and said image shifting means shifts at least one of the right-eye and left-eye images displayed on the right-eye and left-eye image display devices, respectively to satisfy the following condition;

$$1/L - 2 < (\tan \theta_R + \tan \theta_L)/d < 1/L + 2 \text{ for } L \leq 0.5$$

$$0 < (\tan \theta_R + \tan \theta_L)/d < 1/L + 2 \text{ for } L > 0.5$$

wherein L(m) is a distance from the right and left eyes of the viewer to a plane on which said virtual images are formed, $\theta_R$ is an angle between a line of sight of the right eye of the viewer and a normal line to a virtual image plane, $\theta_L$ is an angle between a line of sight of the left eye of the viewer and said plane, and d(m) is a distance between the right and left eyes of the viewer.

According to the invention, each of the right-eye and left-eye image display devices may be advantageously formed by a liquid crystal display device.

BRIEF DESCRIPTION OF THE DRAWINGS

FIGS. 1A, 1B and 1C are schematic plan views showing right-eye and left-eye images displayed in a known stereoscopic video display apparatus;

FIG. 2 is a schematic diagram explaining the operation of the known apparatus;

FIGS. 3A, 3B and 3C are schematic plan views illustrating right-eye and left-eye images displayed in the stereoscopic video display apparatus according to the invention;

FIGS. 5A, 5B and 5C are schematic plan views showing a manner of the image shift according to the invention;

FIG. 6 is a graph showing a relationship between the convergence and the diopter of a human being;

FIG. 7 is a perspective view illustrating an embodiment of the stereoscopic video display apparatus according to the invention;

FIG. 13 is a schematic diagram showing a main portion of another embodiment of the apparatus according to the invention;

FIG. 14 is a schematic view illustrating a portion of another embodiment of the apparatus according to the invention;

FIG. 15 is a graph showing a manner of shifting an image in another embodiment of the apparatus according to the invention; and FIGS. 16A and 16B are schematic diagrams representing the image shift in the embodiment shown in FIG. 15.

DESCRIPTION OF THE PREFERRED EMBODIMENT

Before explaining preferable embodiments of the stereoscopic video display apparatus according to the invention, a principal conception of the present invention will be explained with reference to drawings.

Figure 4:
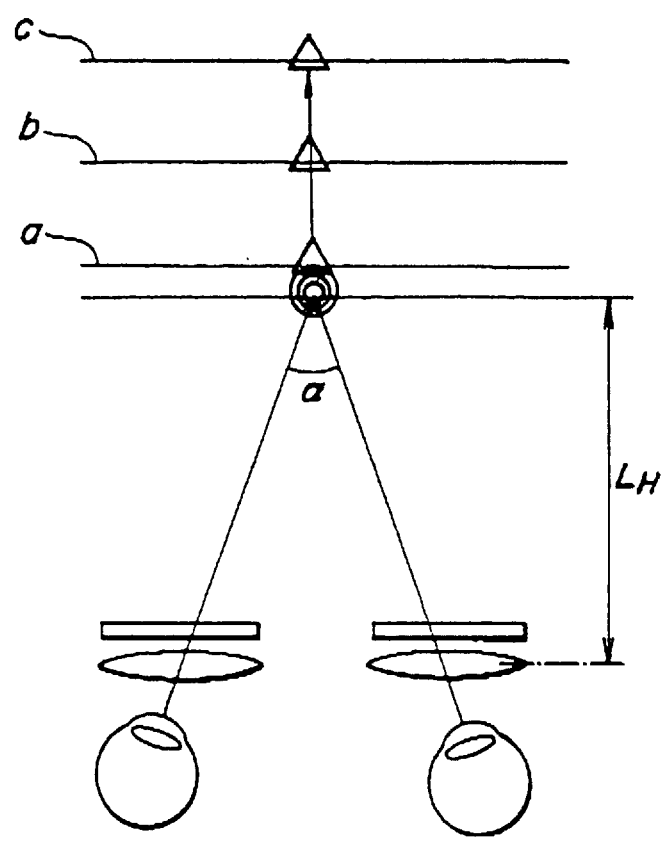
FIG. 4 is a schematic diagram explaining the operation of the apparatus according to the invention.

FIGS. 3A, 3B and 3C are schematic plan views showing right-eye and left-eye images displayed on the displaying means according to the invention. According to the invention, the right-eye and left-eye images are shifted horizontally in directions which are opposite to the directions in which the right-eye and left-eye images are shifted in the known apparatus. That is to say, according to the invention, the right-eye image is gradually shifted rightward and the left-eye image is gradually shifted leftward in such a manner that a position of the subject, i.e. the ball in a sight is not moved. Then, according to the invention, the circular object image is remained still and the triangular object is moved as illustrated in FIG. 4. It should be noted that a size of the ball is increased. In other words, a distance of convergence with respect to the ball is remained substantially constant on a time domain. However, the triangular object is suspected to move away from the viewer although a size of the triangular object is not changed. Therefore, a distance between the ball and the triangular object is increased although the distance of convergence with respect to the ball is not changed.

According to the invention, a specific characteristic of eyes of a human being is utilized. That is to say, the human eyes are very susceptive to a change in a relative distance, but are not sensitive to a change in an absolute distance. The inventors have confirmed experimentally that the human eyes could not feel a movement of a single object in a black background. However, if another object is contained in this image, the viewer can feel a movement of the subject. From this experiment, it can be understood that a human being is very susceptive to a change in a relative distance between two objects, but is not susceptive to a change in an absolute distance of a sole object in a viewing sight. According to the invention, a distance between the ball and the triangular object is changed and a size of the ball is increased while a size of the triangular object is not changed, and therefore the viewer can feel that the ball is coming closer to the viewer. In this manner, according to the invention, the viewer can suspect the movement of the object with a natural feeling of stereoscopic vision, while the distance of convergence can be maintained substantially constant. According to the invention, it is preferable to shift the right-eye and left-eye images in such a manner that the distance of convergence $L_H$ becomes substantially identical with the viewing distance L. Moreover, a subject within a sight gazed by the viewer may be detected by an eye point camera and at least one of right-eye and left-eye images may be shifted in such a manner that the distance of convergence with respect to the thus detected object is kept substantially constant.

In order to enhance the feeling of stereoscopic vision, according to the invention, it is preferable to shift the images including black stripes at right and left side edges such that a width of these black stripes is changed in accordance with the image shift as shown in FIGS. 5A, 5B and 5C. FIG. 5A shows displayed right-eye and left-eye images when the ball is remote from the viewer, FIG. 5B illustrates the ball situating at the viewing distance, and FIG. 5C depicts the ball close to the viewer. In the case of FIG. 5B, it is not necessary to perform the image shift, and black stripes are displayed at both side edges. It should be noted that these black stripes are denoted by double hatching in FIGS. 5A, 5B and 5C. When the ball is seen to move away from the viewer, the image of the triangular object is shifted horizontally toward the ball as depicted in FIG. 5A, and when the ball is suspected to move toward the viewer, the image of the triangular object is shifted horizontally away from the ball as shown in FIG. 5C. In this case, the black stripes are also shifted horizontally by the same amount as that of the triangular object. In this manner, not only the image of the triangular object, but also the black stripes serving as a frame for defining the field of view are moved, and thus the convergence angle of the frame is also changed, so that a distance between the frame and the ball gazed by the viewer is suspected to vary. In this manner, the feeling of stereoscopic viewing can be further improved.

According to the invention, the horizontal image shift is carried out such that the distance of convergence can be kept substantially constant. It is preferable to make the distance of convergence to be identical with the viewing distance. In this case, the distance of convergence may be different from the viewing distance within limited range. This will be explained. It should be noted than an inverse of the viewing distance is called a diopter. From a graph shown in FIG. 6, the distance of convergence may be varied from the viewing distance by ±2 diopters. The graph of FIG. 6 is described in "O plus E", No. 73, December 1985, page 103, FIG. 138. In this graph, the horizontal axis denotes the convergence (angle of convergence) and the vertical axis represents the diopter D, i.e. accommodation. A solid line A having an inclination angle of 45 degrees denotes a region in which the convergence and the diopter are correlated completely, and a region near the above region represents an acceptable region due to focal depth and so on. Outer curves express a fusion limit of right and left eyes. Outermost solid line curves B represent maximum limit of fusion of both eyes, broken line curves C denote a range in which fusion is restarted from a two-image condition, and chain line curves D express a limit of fusion under a condition in which images are seen for 0.5 seconds.

As can be understood from the curves in FIG. 6, fusion of right-eye and left-eye images can be attained even when the images are seen for a short time period as long as the diopter D is within ±2 diopters. Therefore, a natural feeling of stereoscopic vision can be obtained by satisfying the following conditions:

$$1/L - 2 < 1/L_H < 1/L + 2 \quad (L \leq 0.5) \qquad (1)$$

$$0 < 1/L_H < 1/L + 2 \quad (L > 0.5) \qquad (2)$$

wherein L(m) is a viewing distance and $L_H$(m) is a distance of convergence. When an angle between a line of sight of a right eye of a viewer and a direction normal to virtual image plane is $\theta_R$, an angle between a line of sight of the left eye of the viewer and said virtual image plane is $\theta_L$, and a distance of convergence is d(m), the natural feeling of stereoscopic vision can be attained by satisfying the following condition:

$$\frac{1}{L} - 2 < \frac{\tan\theta_R + \tan\theta_L}{d} < \frac{1}{L} + 2 \text{ for } L \leq 0.5 \qquad (1')$$

$$0 < \frac{\tan\theta_R + \tan\theta_L}{d} < \frac{1}{L} + 2 \text{ for } L > 0.5 \qquad (2')$$

Upon effecting the image shift, at least one of right-eye image and left-eye image is shifted horizontally while the above mentioned condition is fulfilled. According to the invention, it is preferable to shift both the right-eye and left-eye images such that for any object in a sight, a distance of convergence and a viewing distance are made identical with each other. To this end, an object at which the viewer is gazing may be detected by using an eye-point camera.

Now preferable embodiments of the invention will be explained with reference to the drawings.

FIG. 7 shows an embodiment of the stereoscopic video display apparatus according to the invention. In the present embodiment, the display apparatus is formed as the head mounted type display apparatus HMD. HMD 100 comprises a display main body 101 including right-eye and left-eye liquid crystal display devices LCDs and right-eye and left-eye optical systems for introducing right-eye and left-eye images displayed on the LCDs into right and left eyes of a viewer wearing HMD. HMD 100 further comprises a supporting member including right and left front frames 102, right and left rear frames 103, and a top head frame 104 to be placed on a top head of the viewer.

Near junctions between the front frames 102 and the rear frames 103, there are provided resilient rear plates 105, which may be formed by a resilient metal plates. The rear plates 105 are urged against portions of the head behind ears of the viewer. The rear plates 105 are provided in a rear cover 106.

In FIG. 7, a reference numeral 122 denotes a signal cable for transmitting video and audio signals from an external, and one end of the cable is connected to a video cassette player 120 having operating switches and knobs 120a. The other end of the cable 122 is connected to a circuitry provided in the HMD 100 by means of the top head frame 104, rear frame 103, front frame 102 and rear plate 105. A reference numeral 109 represents an ear phone for reproducing an audio signal.

It should be noted that a jack may be provided at the free end of the cable 122 and the jack may be connected to a video disk player, TV receiver or computer. In case of connecting the jack to the computer, it is possible to monitor a computer graphics and messages. Further, the cable 122 may be dispensed with by using a wireless signal transmission system. Moreover, the HMD 100 may be supplied from a battery.

Figure 8:
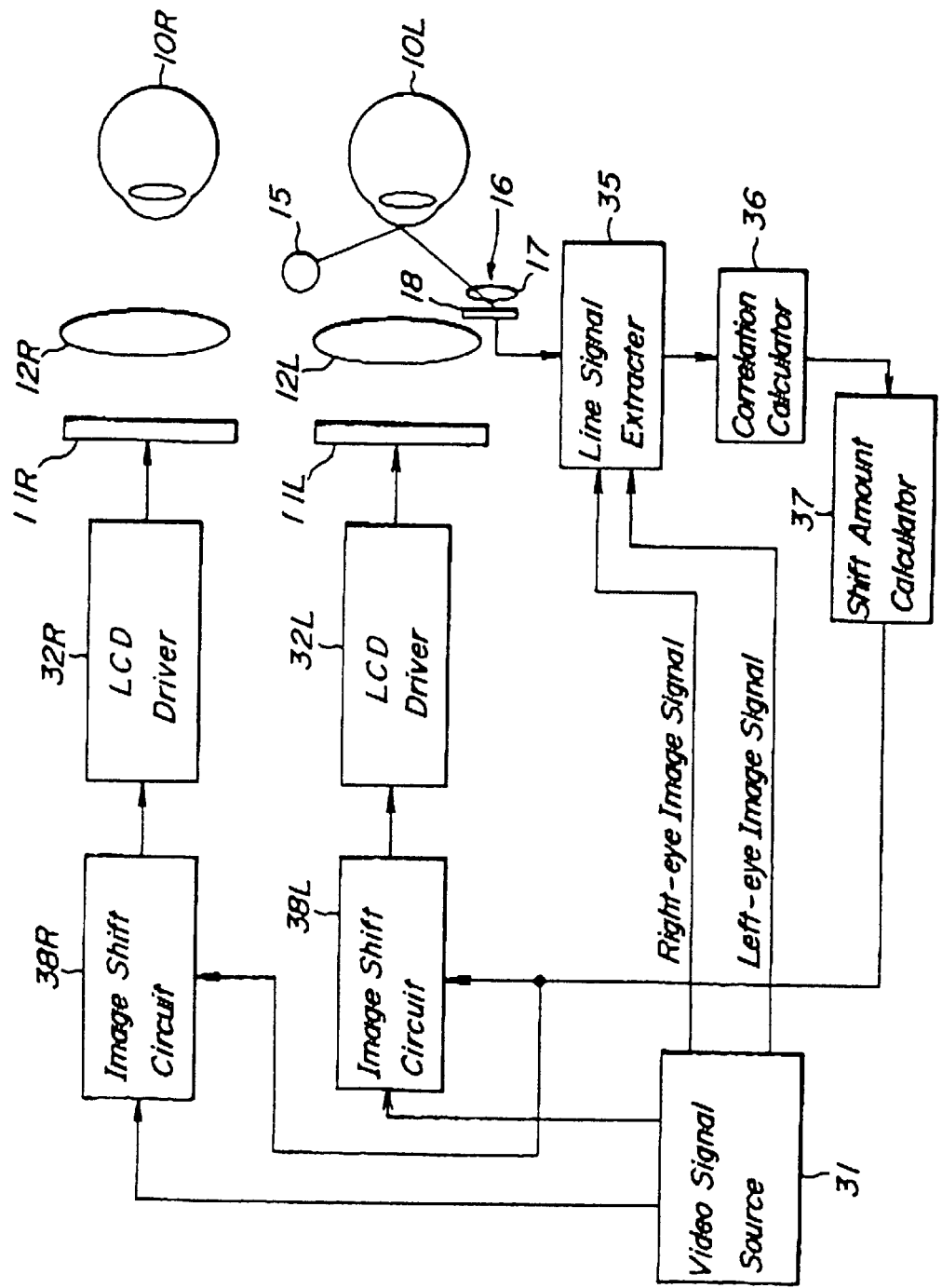
FIG. 8 is a block diagram illustrating the apparatus shown in FIG. 7.

As shown in FIG. 8, the main body of the HMD 100 comprises right-eye and left-eye LCDs 11R and 11L and right-eye and left-eye magnifying lenses 12R and 12L. The LCDs 11R and 11L are driven by right-eye LCD driver 32R and left-eye LCD driver 32L, respectively. These LCD drivers 32R and 32L receive right-eye and left-eye image signals from a video signal source such as a video player 31, and display right-eye image and left-eye image, respectively thereon. It should be noted that if the image shift is not carried out, the right-eye and left-eye images supplied from the video signal source 31 are displayed as shown in FIGS. 1A–1C. The right-eye and left-eye magnifying lenses 12R and 12L form virtual image of the right-eye and left-eye images and these right-eye and left-eye virtual images are seen by the right eye 10R and left eye 10L of the viewer, respectively. In this manner, the viewer can see an enlarged stereoscopic image.

According to the invention, in order to attain a natural feeling of viewing the stereoscopic image, at least one of the right-eye and left-eye images displayed on the right-eye and left-eye LCDs 11R and 11L, respectively is shifted in the horizontal direction such that a distance of convergence becomes substantially equal to a viewing distance. The shift of images displayed on the LCDs 11R and 11L may be performed electronically. In the present embodiment, both the right-eye image displayed on the right-eye LCD 11R and the left-eye image displayed on the left-eye LCD 11L are shifted horizontally. To this end, between the video signal source 31 and the right-eye LCD driver 32R and left-eye LCD driver 32L, there are connected image shift circuits 38R and 38L, respectively. In order to detect an object in a sight gazed by the viewer, there are provided a light source 15 and an eye point detector 16. A direction and an amount of the image shift are derived from the detected eye point.

To this end, there are provided line signal extracting circuit 35, correlation calculating circuit 36 and shift amount calculating circuit 37. The light source 15 and eye point detector 16 are installed in the display main body 101 together with the LCDs, lenses and so on.

Now the whole construction of the stereoscopic video display apparatus according to the invention will be explained also with reference to FIGS. 9–12.

The video signal including right-eye and left-eye images generated by the video signal source 31 is supplied to the line signal extracting circuit 35 to which an output signal from the eye point detector 16 is also supplied. An output signal of the line signal extracting circuit 35 is supplied to the correlation calculation circuit 36 and an output signal of this circuit is supplied to the shift amount calculating circuit 37 as shown in FIG. 8. These circuits operate to determine an object in the display sight at which the viewer gazes and an amount of the image shift is determined by deriving a correlation between right-eye and left-eye images.

Now a preferable mode of determining a relationship between the eye point and the image shift will be explained. In the present embodiment, the eye point detector 16 is provided to detect the eye point of the left eye 10L of the viewer, and thus a line of sight of the left eye 10L is detected. Then, the right-eye image and left-eye image are shifted horizontally in opposite directions by the same amount. However, according to the invention, only the right-eye image seen by the right eye 10R may be shifted, while the left-eye image viewed by the left eye 10L is not shifted. Then, a line of sight does hardly fluctuate by the image shift and thus the image shift may be carried out stably and suitably.

It is preferable that the light source 15 is formed by an invisible light source such as an infrared light source. The eye point detector 16 comprises a lens 17 converging light reflected by a cornea of the left eye 10L and a light detector 18.

Figure 9:
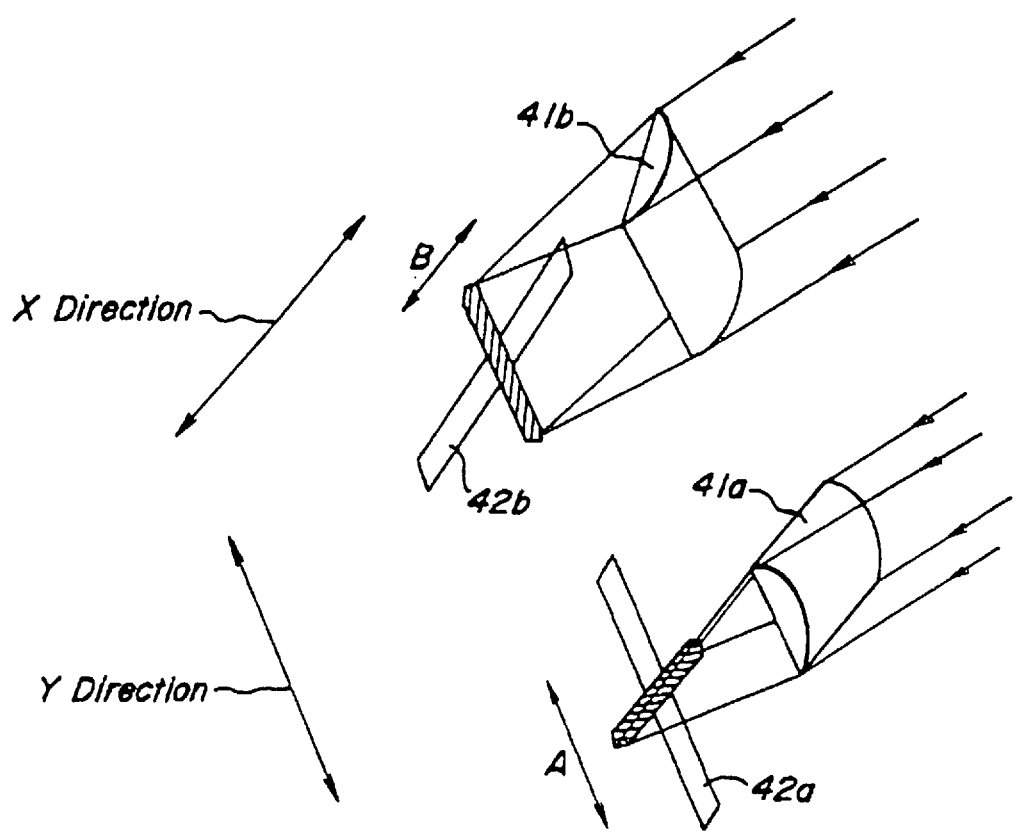
FIG. 9 is a perspective view depicting an eye point camera shown in FIG. 8.

FIG. 9 illustrates a detailed structure of the eye point detector 16. The detector comprises first and second cylindrical lenses 41a and 41b and first and second linear photosensitive diode arrays 42a and 42b. The first cylindrical lens 41a has a refractive power in the vertical direction, i.e. Y direction and the second cylindrical lens 41b has a refractive power in the horizontal direction, i.e. X direction. The first linear photosensitive diode array 42a extends in Y direction and the second linear photosensitive diode array extends in X direction. Therefore, when the eyeball rotates in the vertical direction, a light flux impinging upon the first linear photosensitive diode array 42a via the first cylindrical lens 41a moves in a direction A which is parallel with the vertical direction Y. When the eyeball rotates in the horizontal direction, a light flux impinging upon the second linear photosensitive diode array 42b moves in a direction B parallel with the horizontal direction X. In this manner, positions on the linear photosensitive diode arrays 42a and 42b upon which the light fluxes are made incident by means of the first and second cylindrical lenses 41a and 41b, respectively are changed in accordance with the rotation of the eyeball in the vertical and horizontal directions Y and X, respectively.

According to the invention, the eye point may be detected by using a two dimensional photosensitive diode array. However, the two dimensional photosensitive diode array is much more expensive than the linear photosensitive diode array, and thus a cost of the eye point detector of the present embodiment is very low.

An output signal from the first linear photosensitive diode array 42a represents a vertical coordinate (y) of the eye point in the direction Y and similarly an output signal of the second linear photosensitive diode array 42b represents a horizontal coordinate (x) of the eye point. In this manner, coordinates (x, Y) of the eye point can be detected.

The output signal of the first linear photosensitive diode array 41a representing the Y coordinate is supplied to the line signal extracting circuit 35 and the output signal of the second linear photosensitive diode array 41b representing the X coordinate is supplied to the correlation calculating circuit 36. In the line signal extracting circuit 35, image signals on horizontal lines denoted by the Y coordinate are extracted from the right-eye and left-eye images. Then, the thus extracted line image signals are supplied to the correlation calculating circuit 36 and a correlation between these line image signals is calculated on the basis of the X coordinate. Then, the thus calculated correlation is supplied to the shift amount calculating circuit 37 and an amount of shift of the right-eye image is calculated.

Now a manner of extracting the line image signals from the right-eye and left-eye images and a manner of calculating an amount of image shift will be explained in detail.

Figure 10:
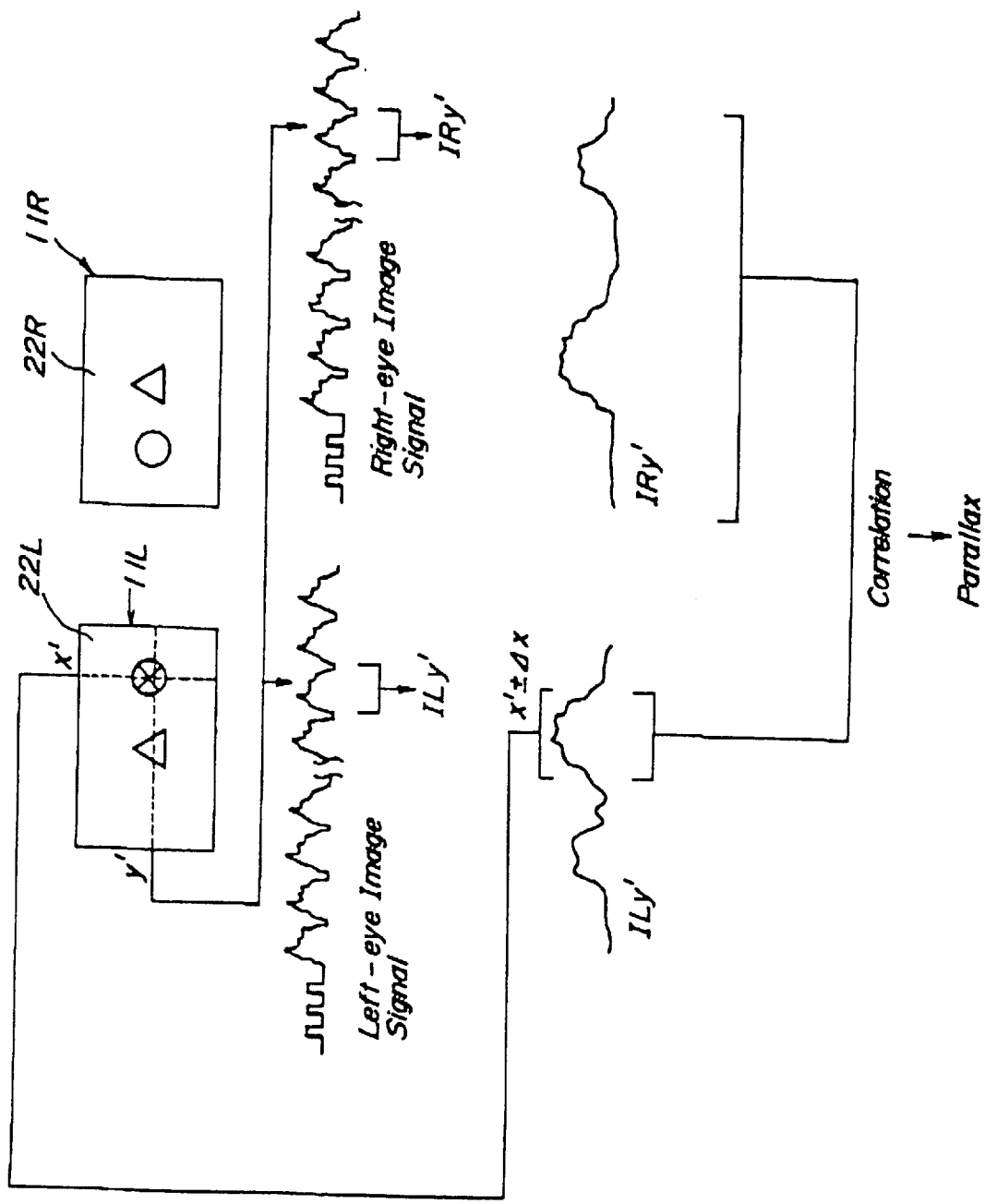
FIG. 10 is a schematic diagram explaining a manner of deriving a parallax.

FIG. 10 is a schematic diagram showing a general conception for determining the image shift. At an upper portion of FIG. 10, there are shown the right-eye image and left-eye image displayed on display planes 22R and 22L of LCDs 11R and 11L. The viewer is gazing at a point in the left-eye image denoted by a cross. This point has coordinates (x', y'). As explained above, the coordinates (x', y') are detected by the eye point detector 16. Then, an image signal of a line having a vertical coordinate y' is extracted from the left-eye image and an image signal of a corresponding line in the right-eye image is extracted. The thus extracted line image signals of the right-eye and left-eye images are denoted by IRy' and ILy', respectively. Then, a correlation between a signal portion of the line image signal ILy' having a region of x'±Δx and the line image signal IRy' of the right-eye image is derived. This may be advantageously carried out by the effecting the following equation:

$$S(\tau) = \int_{x - \Delta x}^{x + \Delta x} L(x) R(x - \tau) dx \quad (3)$$

A left term $S(\tau)$ represents a time difference between the signal portion in the left-eye image having a coordinate x' and a signal portion in the right-eye image having the highest correlation with respect to said signal portion in the left-eye image. Then, from the thus detected time difference, an amount of parallax can be detected. The thus derived parallax amount is supplied to the shift amount calculating circuit 37 and an amount of shift over which the right-eye image and left-eye image have to be shifted in the horizontal direction is calculated. In this manner, an amount of the image shift can be detected accurately by deriving the correlation between the right-eye image and the left-eye image.

As explained above, in the present embodiment, the calculation for deriving the correlation between the right-eye image and the left-eye image can be performed on a single line, and thus the calculation can be carried out at a high speed within a short time period. It should be noted that according to the invention, the calculation of correlation may be conducted for a small two dimensional domain instead of a line. Also in this case, the correlation can be performed at a high speed within a short time period as compared with a case in which a calculation of correlation is carried out over a whole image.

Figure 11:
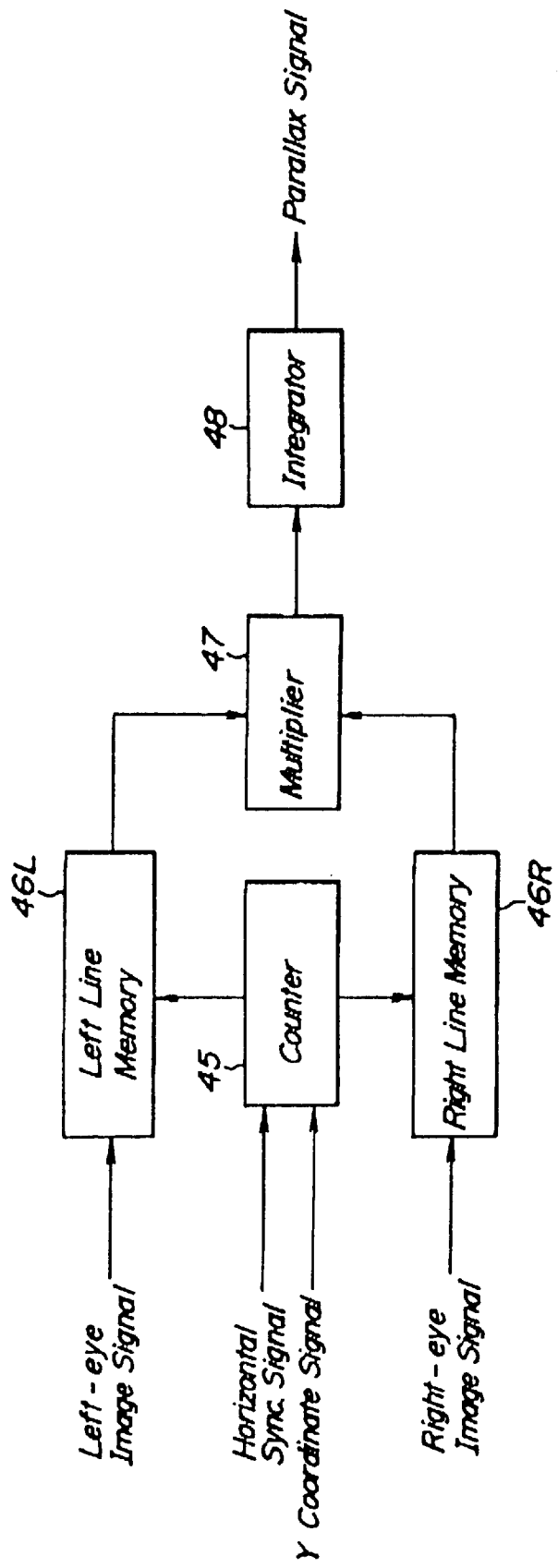
FIG. 11 is a block diagram showing line signal extractor and correlation calculator.

FIG. 11 is a block diagram showing an embodiment of the line signal extracting circuit 35 and correlation calculating circuit 36. The right-eye image signal and left-eye image signal are supplied to right line memory 46R and 46L, respectively, and the Y coordinate signal is supplied to a counter 45 as a counter set signal. To the counter 45 there is also supplied horizontal synchronizing pulses and the counter counts the horizontal synchronizing pulses.

When the counter 45 has counted up to the number of lines denoted by the Y coordinate detected by the eye point camera, the right-eye and left-eye image signals are written into the line memories 46R and 46L, respectively. Parts of the image signals stored in the line memories 46R and 46L are selectively read out of the line memories and are supplied to the multiplier 47. Then, an output signal of the multiplier 47 is supplied to the integrator 48 to derive a parallax signal.

The parallax signal thus obtained is used to determine an amount of the image shift. As shown in FIG. 6, the parallax signal derived from the calculating circuit 36 is supplied to the shift amount calculating circuit 37. In the shift amount calculating circuit 37, the parallax signal is compared with a parallax corresponding to a diopter which has been set for the HMD, and derives a difference therebetween as a shift amount signal.

Figure 12:
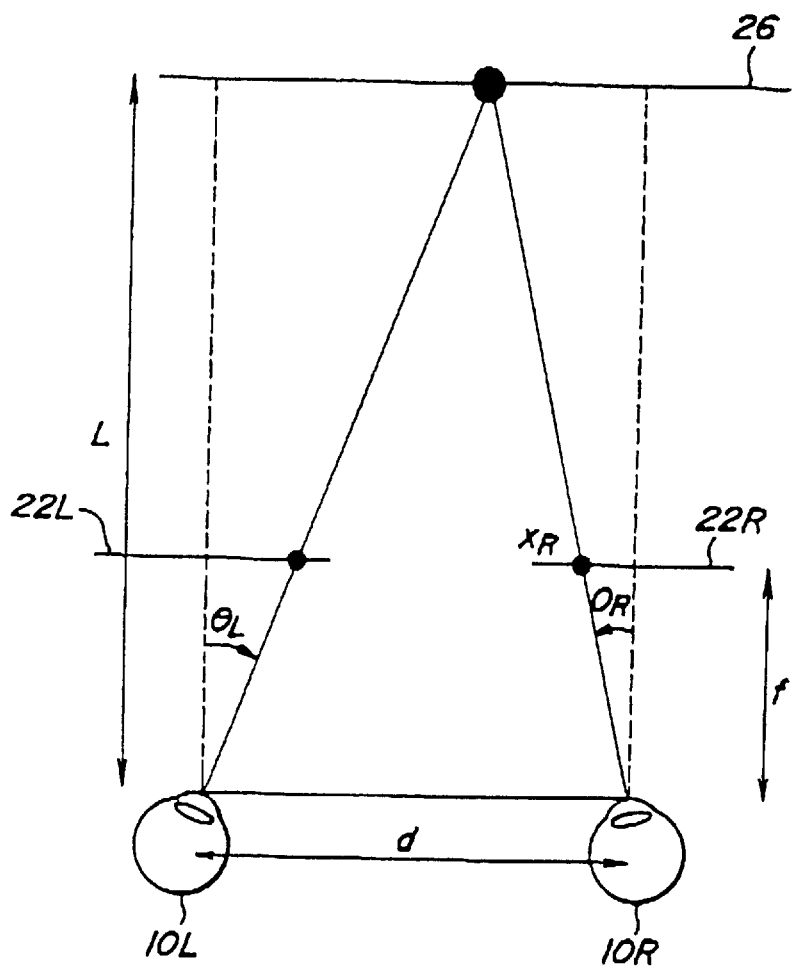
FIG. 12 is a schematic diagram explaining the image shift.

The principle of shifting the image according to the invention has been explained above with reference to FIGS. 3–5. In a preferable embodiment of the present invention, the image shift is carried out in such a manner that the viewing distance is made equal to the distance of convergence as illustrated in FIG. 12. To this end, the following condition has to be satisfied:

$$L (\tan \theta_R + \tan \theta_L) = d \quad (4)$$

wherein $\theta_L$ is an angle between the line of sight of the left eye and a normal line to the virtual image plane 26, $\theta_R$ is an angle between the line of sight of the right eye and a normal line to the plane 26, L is the viewing distance, i.e. the distance from the eyes to the virtual image plane 26 and d is a distance between the right and left eyes.

There is a following relationship between a display position on the right-eye LCD plane (display plane 22R) and the angle of the line of sight of the right eye $\theta_R$:

$$\tan \theta_R = X_R / f \quad (5)$$

wherein f is a focal length of the magnifying lens. From the equations (4) and (5), the image shift can be carried out by satisfying the following condition:

$$X_R = (f/L) \cdot (d - L \tan \theta_L) \quad (6)$$

Therefore, the above equation (4) may be rewritten as follows:

$$(\tan \theta_R + \tan \theta_L) = d/L \quad (7)$$

Then, $$\tan \theta_R = (d/L) - \tan \theta_L \quad (8)$$

is obtained. It should be noted that the above mentioned equation (1) can be derived from the basic equation (4) by considering a modification represented by the following equation (9) and the above explained acceptable range of ±2 diopters.

$$(\tan \theta_R + \tan \theta_L)/d = 1/L \quad (9)$$

The above equation (6) can be obtained from the equations (5) and (8). In the preferable embodiment, the image shift is conducted such that the above equation (6) is satisfied. Then, the viewing distance L and the distance of convergence can be brought into identical with each other.

In the present embodiment, the display position of the right-eye image prior to the image shift can be known from the calculation of the parallax, and thus the image shift amount can be derived as a difference between the display position and the above calculated distance XR.

The thus obtained amount of the image shift is supplied to the right-eye image shift circuit 38R and left-eye image shift circuit 38L as shown in FIG. 8, and the right-eye image signal and left-eye image signal from the video signal source 31 are shifted by the same image shift amount but in opposite directions. Each of the right-eye and left-eye image shift circuits 38R and 38L may be formed by a variable delay circuit whose delay time can be controlled in accordance with the amount of image shift.

The thus shifted right-eye and left-eye image signals are then supplied to the right-eye and left-eye LCD drivers 32R and 32L, respectively, and the shifted right-eye and left-eye images are displayed on the right-eye and left-eye LCDs 11R and 11L, respectively.

In the embodiment explained above, the image shift is carried out in such a manner that the viewing distance becomes substantially equal to the distance of convergence, and the viewer can have a natural feeling of stereoscopic viewing. According to the invention, it is no more necessary to provide any mechanism for mechanically shifting the image, and therefore the whole apparatus can be small in size, light in weight and cheap in cost. Therefore, the video display apparatus is particularly suitable for the head mounted type display.

In the present embodiment, the gazing point of the viewer is detected from the movement of the left eyeball to derive a main object in a sight and the right-eye and left-eye images are shifted in relation to the detected gazing point. However, according to the invention, one of the right-eye and left-eye images may be shifted. In any case, a natural feeling of stereoscopic viewing can be attained by satisfying the condition (1) or (2).

Now a second embodiment of the stereoscopic video display apparatus according to the invention will be explained. In the present embodiment, the optical system is arranged such that the frames are not fused. Then a decrease in the stereoscopic viewing due to the image frame can be suppressed. According to the invention, the angle of convergence with respect to a main object in sight at which the viewer gazes is made constant and angles of convergence of other objects in the sight are changed. If the frame defining the field of view is fixed, a distance between a center and the object at which the viewer gazes is not changed. Then, a feeling of stereoscopic viewing might be decreased depending upon a position of the main object. In the present embodiment, this problem is removed by not fusing the image frame.

FIG. 13 is a main portion of the present embodiment and shows an arrangement of the right-eye and left-eye LCDs 11R and 11L and right-eye and left-eye magnifying lenses 12R and 12L. As compared with the previous embodiment, in the present embodiment these elements 11R, 11L, 12R and 12L are arranged such that an optical axis of the right-eye optical system 11R, 12R and an optical axis of the left-eye optical system 11L, 12L are diverging toward the virtual image plane. The remaining structure of the present embodiment is basically identical with the previous embodiment. Therefore, the position of a main object in a sight is detected by the eye point camera, a parallax is calculated from the detected position of the main object, and a amount of the image shift is calculated from the parallax. Then, background images only in the right-eye image are shifted, while the left-eye image is not shifted at all.

In the present embodiment, only images of objects situating in a center portion of sight can be suspected as a stereoscopic image, but right and left peripheral portions can be seen only by the right and left eyes, respectively and can not be suspected as a stereoscopic image. That is to say, since the right-eye and left-eye images of the frame are fused, a distance between the main object and the frame is not suspected. In this manner, a decrease in the feeling of stereoscopic viewing can be suppressed.

Now another embodiment of the present invention will be explained with reference to FIG. 14. The present embodiment differs from the previous embodiment in a point that the position of the main object in a sight is detected by measuring a rotation of an eyeball by an electrode which is brought into contact with a skin around an eye. As depicted in FIG. 14, a pad 52 is adjustably secured by a screw 51 at a position near the left eye of the viewer wearing the HMD 100. On the pad 52 is arranged an electrode 53 which is brought into contact with the skin of the viewer around the left eye. Then, a signal from the electrode 53 represents the rotation of the eyeball, and thus a gazing point in a sight can be detected therefrom. It should be noted that the electrode 53 may be secured to a leaf spring extending inwardly of the HMD.

Another embodiment of the apparatus according to the invention will be explained. In the embodiments so far explained, the image shift is conducted such that the angle of convergence of the gazing point becomes substantially identical with the viewing distance irrespective of a distance of the gazing point in the original sight in a depth direction. Now it is assumed that an angle of convergence of an object at which the viewer is gazing changes largely and no other object is existent in a sight. Then, only a size of the object is changed, but a distance to the object is not changed, so that a feeling of stereoscopic vision could not be attained. In the present embodiment, in order to mitigate the above mentioned drawback by changing the convergence angle by compressing a fluctuation of the convergence angle of the original image into a domain near the viewing distance.

FIGS. 15 and 16 are schematic diagrams showing a manner of shifting the images in the horizontal direction in the present embodiment. FIG. 15 illustrates a relationship between the convergence prior to the image shift and the convergence after the image shift. Now it is assumed that the convergence of the original image $(\tan \theta_R + \tan \theta_L)/d$ fluctuates from a minimum value $\alpha$ to a maximum value $\beta$ plotted on the horizontal axis in FIG. 15. Then, the viewing distance plotted on the vertical axis in FIG. 15 is changed proportionally about a center of 1/L within a range of ±2 diopters (from (1/L)−2 to (1/L)+2).

Then a distance of depth of the object is converted as illustrated in FIG. 16. FIG. 16A shows the original image prior to the image shift and FIG. 16B represents the change in a distance to the object after the image shift. According to the invention, the distance to the object is changed about the viewing distance L within ±2 diopters. This can be realized by performing the calculation in the shift amount calculating circuit 37 shown in FIG. 8 in accordance with the function illustrated in FIG. 15.

In the present embodiment, even if the single object is existent in a sight, a feeling of stereoscopic vision can be attained, while the distance to the object is changed within a rather narrow range about the viewing distance L. Therefore, even if the convergence angle changes largely, the natural feeling of stereoscopic vision can be obtained.

In the present embodiment, the convergence after the image shift is proportional to the convergence prior to the image shift as shown in FIG. 15, but according to the invention, the convergence after the image shift may be non-linear with respect to the convergence prior to the image shift.

It should be noted that the present invention is not limited to the embodiments explained above, but many modifications and alternations may be conceived by those skilled in the art within the scope of claims.

What is claimed is:

1. A stereoscopic video display apparatus comprising:

a displaying means for displaying a right-eye image to be exclusively seen by a right eye of a viewer and a left-eye image to be exclusively seen by a left eye of the viewer, said right-eye and left-eye images being derived from a video signal supplied to the stereoscopic video display apparatus from an applied video signal source, said right-eye and left-eye images composing a stereoscopic image to be seen by the viewer; and an image shifting means for performing a horizontal shift on at least one of said right-eye image and left-eye image displayed on said displaying means;

wherein:

said image shifting means comprises controlling means for controlling the horizontal shift such that a distance of convergence caused by the right-eye image and the left-eye image displayed on the displaying means is maintained substantially constant on a time domain despite a change in the video signal.

2. An apparatus according to claim 1, wherein said controlling means maintains the distance of convergence to be substantially equal to a constant viewing distance.

3. An apparatus according to claim 2, wherein the apparatus further comprises right-eye and left-eye optical systems for forming enlarged virtual images of the right-eye and left-eye images which are seen by the right and left eye of a viewer, respectively, and a supporting means for supporting said displaying means and optical systems.

4. An apparatus according to claim 2, wherein said controlling means shifts at least one of the right-eye and left-eye images such that the following condition is satisfied:

$$1/L - 2 < 1/L_H < 1/L + 2 \text{ for } L \leq 0.5$$

$$0 < 1/L_H < 1/L + 2 \text{ for } L > 0.5$$

wherein $L_H$(m) is the distance of convergence and L(m) is the viewing distance.

5. An apparatus according to claim 4, wherein said controlling means shifts at least one of the right-eye and left-eye images such that the distance of convergence after the image shift in the horizontal direction becomes larger in accordance with an increase of the distance of convergence prior to the image shift.

6. An apparatus according to claim 2, wherein the apparatus further comprises a means for denoting a part of an image display area of the image displaying means, a means for calculating a parallax of said denoted part of the image display area, and a means for determining an amount of the image shift in accordance with said parallax, and said image shifting means shifts at least one of the right-eye and left-eye images by an amount determined by said means for determining the amount of the image shift.

7. An apparatus according to claim 6, wherein said means for denoting the part of the image display area comprises a gazing point detecting means for detecting a point in sight at which the viewer gazes.

8. An apparatus according to claim 7, wherein said gazing point detecting means comprises a means for measuring an angle of a line of sight of one of the right and left eyes of the viewer and a means for detecting coordinates (x, y) of the gazing point, and said parallax calculating means derives the parallax by taking a correlation between the right-eye image and the left-eye image.

9. An apparatus according to claim 8, wherein said parallax calculating means extracts horizontal line image signals from the right-eye and left-eye images in accordance with a vertical coordinate y, and calculates a correlation between the horizontal line image signals in accordance with a horizontal coordinate x to derive the parallax.

10. An apparatus according to claim 8, wherein said image shifting means shifts both the right-eye and left-eye images by the same amount but in opposite directions.

11. An apparatus according to claim 8, wherein said image shifting means shifts the other of the right-eye and left-eye images.

12. An apparatus according to claim 8, wherein said means for measuring an angle of a line of sight of one of the right and left eyes of the viewer comprises an eye point camera having a light source for emitting light onto an eyeball of the viewer and a photodetector for receiving light reflected by the eyeball, said photodetector including first and second linear photo-sensor arrays and first and second cylindrical lenses.

13. An apparatus according to claim 12, wherein said parallax calculating means extracts horizontal line image signals from the right-eye and left-eye images in accordance with a vertical coordinate y, and calculates a correlation between the horizontal line image signals in accordance with a horizontal coordinate x to derive the parallax; and said horizontal line image signals of the right-eye and left-eye images corresponding to the vertical coordinate y are extracted in accordance with an output signal from said first linear photo-sensor array, and said correlation is calculated in accordance with an output signal from said second linear photo-sensor array.

14. An apparatus according to claim 2, wherein a black stripe having a width substantially equal to an amount of the image shift is displayed at a right hand side of the image when the image is shifted leftward, and a black stripe having a width substantially equal to an amount of the image shift is displayed at a left hand side of the image when the image is shifted rightward.

15. An apparatus according to claim 2, wherein the right-eye and left-eye images define frames which are not fused.

16. An apparatus according to claim 1, wherein said displaying means includes a right-eye image display device and a left-eye image display device, said apparatus further comprises a right-eye magnifying lens for generating a virtual image of the right-eye image which can be seen by the right eye of the viewer and a left-eye magnifying lens for generating a virtual image of the left-eye image which can be seen by the left eye of the viewer, and said image shifting means shifts at least one of the right-eye and left-eye images displayed on the right-eye and left-eye image display devices, respectively to satisfy the following condition;

$1/L-2 < (\tan \theta_R + \tan \theta_L)/d < 1/L+2$ ($L \leq 0.5$)

$0 < (\tan \theta_R + \tan \theta_L)/d < 1/L+2$ ($L > 0.5$)

wherein L(m) is a distance from the right and left eyes of the viewer to a plane on which said virtual images are formed, $\theta_R$ is an angle between a line of sight of the right eye of the viewer and a normal line to said plane, $\theta_L$ is an angle between a line of sight of the left eye of the viewer and said plane, and d(m) is a distance between the right and left eyes of the viewer.

17. An apparatus according to claim 16, wherein said apparatus further comprising a means for supporting said display devices and magnifying lenses on a head or face of the viewer.

18. An apparatus according to claim 16, wherein said image shifting means shifts at least one of the right-eye and left-eye images such that a value proportional to a convergence angle $(\tan \theta_R + \tan \theta_L)/d$ after the image shift in the horizontal direction becomes larger in accordance with an increase of a value proportional to a convergence angle $(\tan \theta'_R + \tan \theta'_L)/d$ prior to the image shift, wherein $\theta'_R$ is an angle between a line of sight of the right eye of the viewer and a normal line to a virtual image plane prior to the image shift and $\theta'_L$ is an angle between a line of sight of the left eye of the viewer and said plane prior to the image shift.

19. An apparatus according to claim 16, wherein the apparatus further comprises a means for denoting parts of image display areas of the image display devices, a means for calculating a parallax of said denoted parts of the image display areas, and a means for determining an amount of the image shift in accordance with said parallax, and said image shifting means shifts at least one of the right-eye and left-eye images by an amount determined by said means for determining the amount of the image shift.

20. An apparatus according to claim 19, wherein said means for denoting the part of the image display area comprises a gazing point detecting means for detecting a point in sight at which the viewer gazes.

21. An apparatus according to claim 20, wherein said gazing point detecting means comprises a means for measuring an angle of a line of sight of one of the right and left eyes of the viewer and a means for detecting coordinates (x, y) of the gazing point, and said parallax calculating means derives the parallax by taking a correlation between the right-eye image and the left-eye image.

22. An apparatus according to claim 21, wherein said parallax calculating means extracts horizontal line image signals from the right-eye and left-eye images in accordance with a vertical coordinate y, and determines a correlation between the horizontal line image signals in accordance with a horizontal coordinate x to derive the parallax.

23. An apparatus according to claim 21, wherein said image shifting means shifts both the right-eye and left-eye images by the same amount but in opposite directions.

24. An apparatus according to claim 21, wherein said image shifting means shifts the other of the right-eye and left-eye images.

25. An apparatus according to claim 21, wherein said means for measuring an angle of a line of sight of one of the right and left eyes of the viewer comprises an eye point camera having a light source for emitting light onto an eyeball of the viewer and a photodetector for receiving light reflected by the eyeball, said photodetector including first and second linear photo-sensor arrays and first and second cylindrical lenses.

26. An apparatus according to claim 25, wherein:

said parallax calculating means extracts horizontal line image signals from the right-eye and left-eye images in accordance with a vertical coordinate y, and calculates a correlation between the horizontal line image signals in accordance with a horizontal coordinate x to derive the parallax; and said horizontal line image signals of the right-eye and left-eye images corresponding to the vertical coordinate y are extracted in accordance with an output signal from said first linear photo-sensor array, and said correlation is calculated in accordance with an output signal from said second linear photo-sensor array.

27. An apparatus according to claim 16, wherein a black stripe having a width substantially equal to an amount of the image shift is displayed at a right hand side of the image when the image is shifted leftward, and a black stripe having a width substantially equal to an amount of the image shift is displayed at a left hand side of the image when the image is shifted rightward.

28. An apparatus according to claim 16, wherein the right-eye and left-eye images define frames which are not fused.

29. An apparatus according to claim 28, wherein said right-eye and left-eye magnifying lenses are arranged such that optical axes of these lenses diverge toward the virtual image plane.

30. A stereoscopic video display apparatus comprising:

a displaying means for displaying a right-eye image to be exclusively seen by a right eye of a viewer and a left-eye image to be exclusively seen by a left eye of the viewer, said right-eye and left-eye images composing a stereoscopic image;

an image shifting means for performing a horizontal shift on at least one of said right-eye image and said left-eye image displayed on said displaying means such that a distance of convergence is maintained substantially constant on a time domain and becomes substantially identical with a viewing distance;

denoting means for denoting a part of an image display area of the displaying means;

parallax calculating means for calculating a parallax of the part of the image display area denoted by the denoting means; and determining means for determining an amount of the horizontal shift in accordance with the parallax, the image shifting means shifting at least one of the right-eye and left-eye images by said amount determined by the determining means.

31. A stereoscopic video display apparatus comprising:

a displaying means for displaying a right-eye image to be exclusively seen by a right eye of a viewer and a left-eye image to be exclusively seen by a left eye of the viewer, said right-eye and left-eye images composing a stereoscopic image; and an image shifting means for performing a horizontal shift on at least one of said right-eye image and said left-eye image displayed on said displaying means such that a distance of convergence is maintained substantially constant on a time domain and becomes substantially identical with a viewing distance;

the displaying means displaying a black stripe having a width substantially equal to an amount of the horizontal shift (i) at a right side of said at least one of the right-eye image and the left-eye image when the horizontal shift is leftward and (ii) at a left side of said at least one of the right-eye image and the left-eye image when the horizontal shift is rightward.

32. A stereoscopic video display apparatus comprising:

a displaying means for displaying a right-eye image to be exclusively seen by a right eye of a viewer and a left-eye image to be exclusively seen by a left eye of the viewer, said right-eye and left-eye images composing a stereoscopic image, said displaying means comprising a right-eye image display device and a left-eye image display device;

an image shifting means for performing a horizontal shift on at least one of said right-eye image and left-eye image displayed on said displaying means such that a distance of convergence is maintained substantially constant on a time domain;

a right-eye magnifying lens for generating a virtual image of the right-eye image which can be seen by the right eye of the viewer;

a left-eye magnifying lens for generating a virtual image of the left-eye image which can be seen by the left eye of the viewer;

denoting means for denoting a part of an image display area of the displaying means;

parallax calculating means for calculating a parallax of the part of the image display area denoted by the denoting means; and determining means for determining an amount of the horizontal shift in accordance with the parallax, the image shifting means shifting at least one of the right-eye and left-eye images by said amount determined by the determining means;

said image shifting means performing the horizontal shift on at least one of the left-eye and right-eye images to satisfy $$1/L-2 < (\tan \theta_R + \tan \theta_L)/d < 1/L+2 \quad (L \leq 0.5)$$

$$0 < (\tan \theta_R + \tan \theta_L)/d < 1/L+2 \quad (L > 0.5)$$

wherein L(m) is a distance from the right and left eyes of the viewer to a plane on which the virtual images are formed, $\theta_R$ is an angle between a line of sight of the right eye of the viewer and a normal line to said plane, $\theta_L$ is an angle between a line of sight of the left eye of the viewer and said normal line to said plane, and d(m) is a distance between the right and left eyes of the viewer.

33. A stereoscopic video display apparatus comprising:

a displaying means for displaying a right-eye image to be exclusively seen by a right eye of a viewer and a left-eye image to be exclusively seen by a left eye of the viewer, said right-eye and left-eye images composing a stereoscopic image, said displaying means comprising a right-eye image display device and a left-eye image display device;

an image shifting means for performing a horizontal shift on at least one of said right-eye image and left-eye image displayed on said displaying means such that a distance of convergence is maintained substantially constant on a time domain;

a right-eye magnifying lens for generating a virtual image of the right-eye image which can be seen by the right eye of the viewer; and a left-eye magnifying lens for generating a virtual image of the left-eye image which can be seen by the left eye of the viewer;

said image shifting means performing the horizontal shift on at least one of the left-eye and right-eye images to satisfy $$1/L-2 < (\tan \theta_R + \tan \theta_L)/d < 1/L+2 \quad (L \leq 0.5)$$

$$0 < (\tan \theta_R + \tan \theta_L)/d < 1/L+2 \quad (L > 0.5)$$

wherein L(m) is a distance from the right and left eyes of the viewer to a plane on which the virtual images are formed, $\theta_R$ is an angle between a line of sight of the right eye of the viewer and a normal line to said plane, $\theta_L$ is an angle between a line of sight of the left eye of the viewer and said normal line to said plane, and d(m) is a distance between the right and left eyes of the viewer; and the displaying means displaying a black stripe having a width substantially equal to an amount of the horizontal shift (i) at a right side of said at least one of the right-eye image and the left-eye image when the horizontal shift is leftward and (ii) at a left side of said at least one of the right-eye image and the left-eye image when the horizontal shift is rightward.

* * * * *